April 10, 1934.   G. SCHLESINGER   1,954,183
APPARATUS FOR MANUFACTURING HOLLOW BODIES FROM PLY-WOOD
Filed Aug. 18, 1930   3 Sheets-Sheet 1
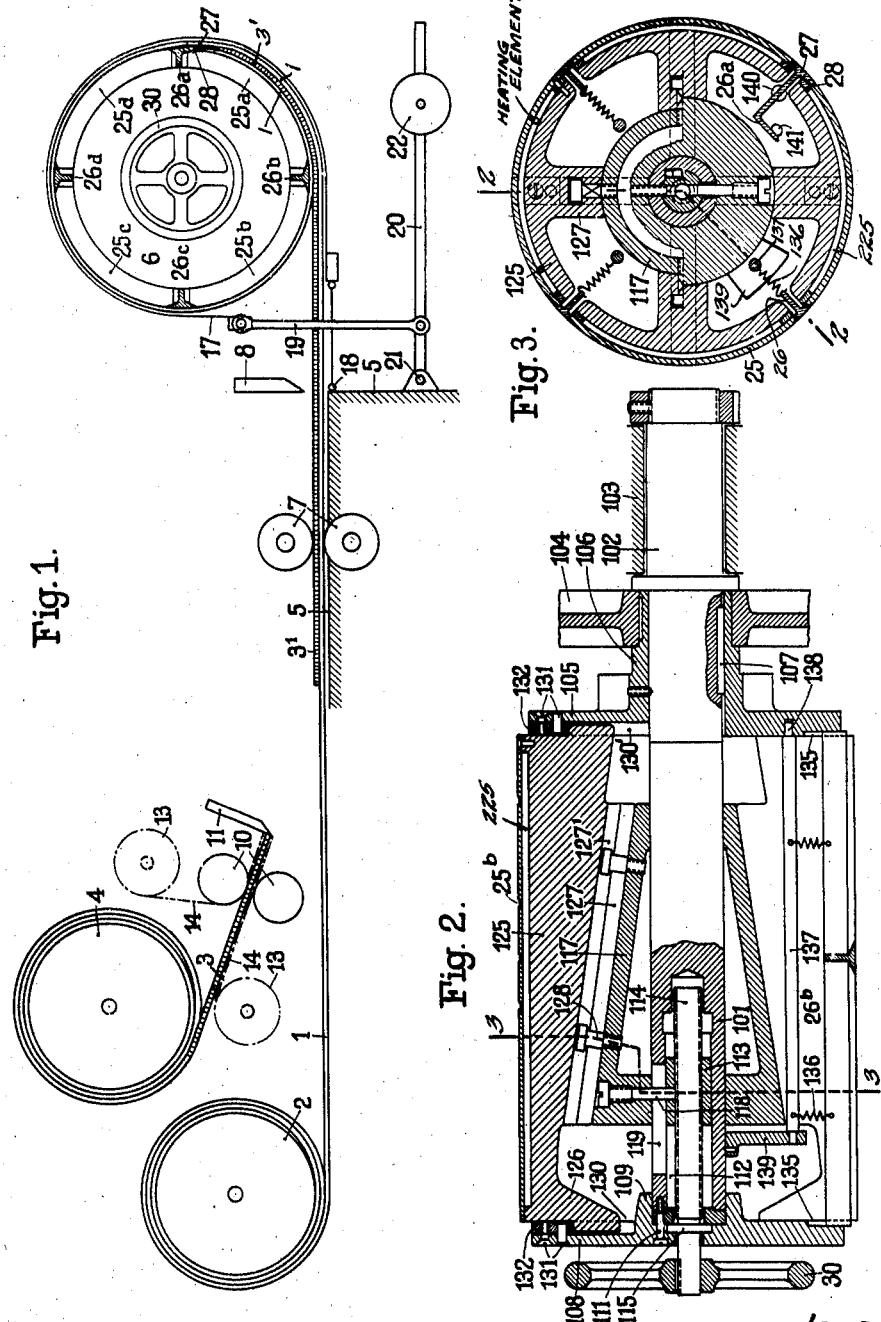

April 10, 1934. G. SCHLESINGER 1,954,183
APPARATUS FOR MANUFACTURING HOLLOW BODIES FROM PLY-WOOD
Filed Aug. 18, 1930 3 Sheets-Sheet 2
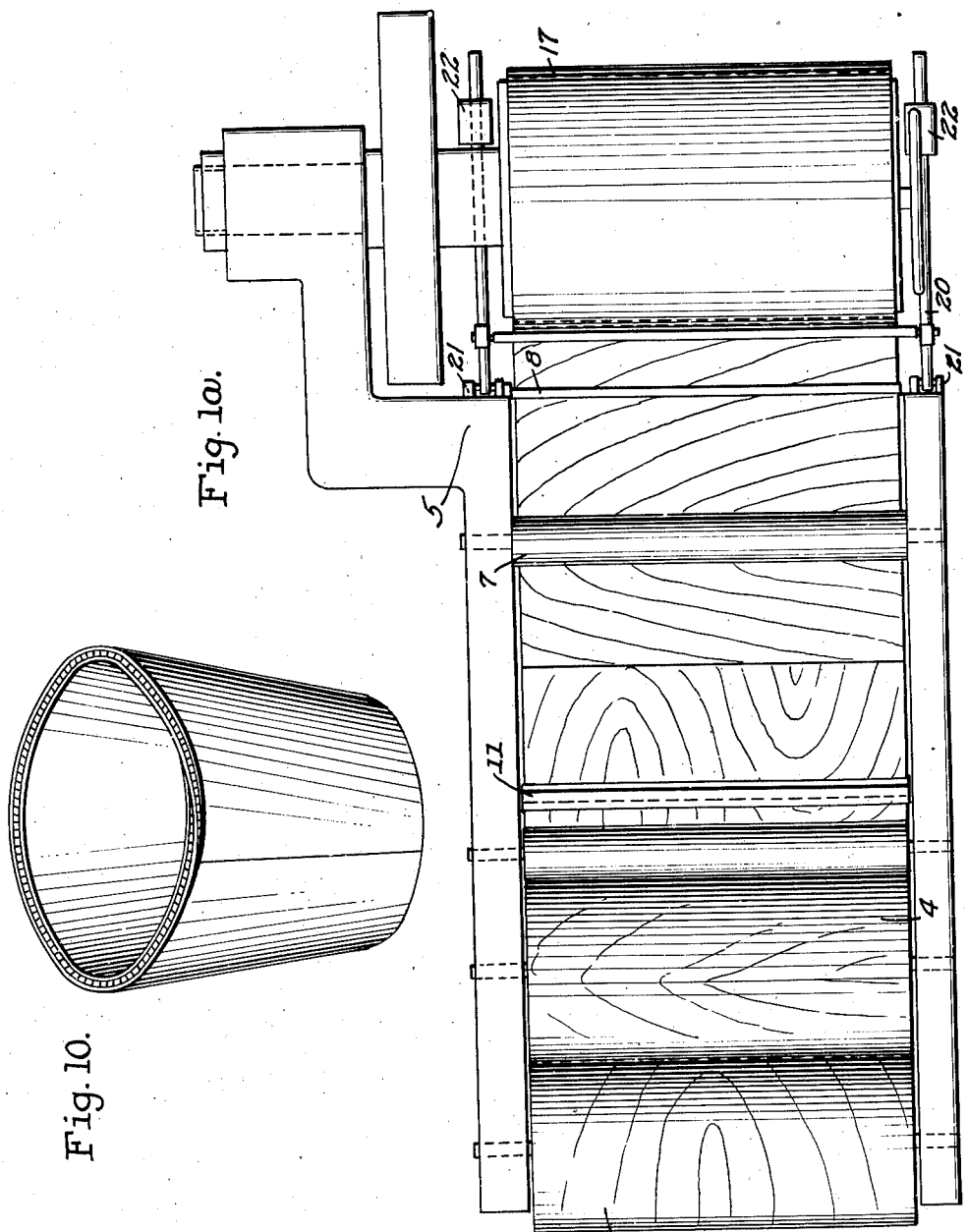

April 10, 1934.  G. SCHLESINGER  1,954,183
APPARATUS FOR MANUFACTURING HOLLOW BODIES FROM PLY-WOOD
Filed Aug. 18, 1930   3 Sheets-Sheet 3
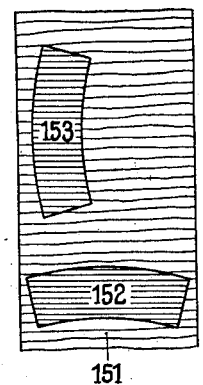
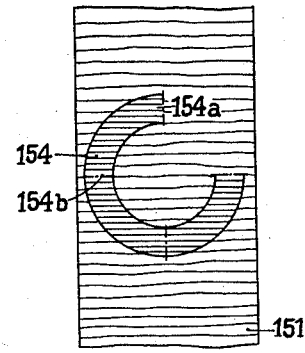
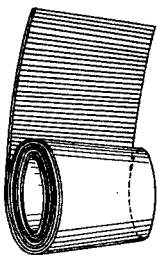
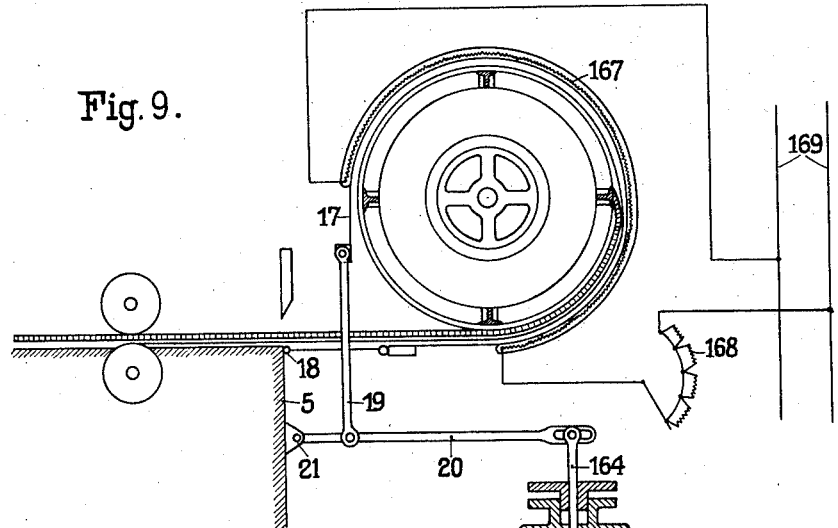
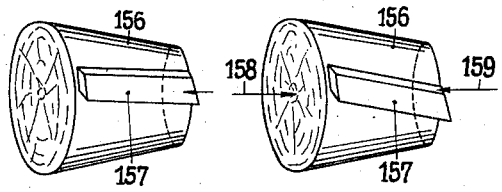
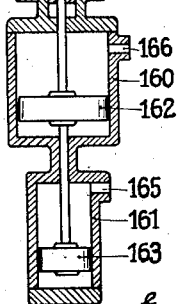
Inventor:
Georg Schlesinger
by Dean, Fairbanks, Hirsch & Foster
his Attorneys Patented Apr. 10, 1934

1,954,183

UNITED STATES PATENT OFFICE 1,954,183

APPARATUS FOR MANUFACTURING HOLLOW BODIES FROM PLY-WOOD

Georg Schlesinger, Berlin-Charlottenburg, Germany, assignor to Aktiengesellschaft für Holzveredlung, Zurich, Switzerland, a corporation of Switzerland Application August 18, 1930, Serial No. 475,966
In Germany September 7, 1929

12 Claims. (Cl. 144—268)

My invention relates to improvements in apparatus for manufacturing hollow bodies from ply-wood.

As is well known ply-wood consists of several superposed sheets of veneer glued together with their grain crossing. In general ply-wood is of three layers; that is upon one layer of veneer with the grain longitudinal there is superposed a layer of veneer with the grain extending transversely; upon which in turn is superposed a layer of veneer with the grain again longitudinal. These three superposed veneers with their grain crossing form the so-called ply-wood after they have been glued together. It is recognized by those skilled in the art that even the production of flat plates of ply-wood from veneer with initially crossed grain and glued together present great practical difficulties; because, in contradistinction to layers of wood with grain in like direction, which on the whole easily adhere by gluing, wood layers with crossed grain permit of gluing only with great difficulty, particularly in the case of woods having a hard body; as for instance beech wood. For this reason in the preparation of ply-wood plates, a high pressure, as by means of hydraulic presses, and a high temperature for substantial periods of time must be applied to the superposed layers of veneer with their interposed layers of glue, and their crossed grain. And much more difficult, of course, than the preparation of plane ply-wood plates, which can be readily produced while stationary in a hydraulic press, is the manufacture of ply-wood bodies by winding. To provide a method of achieving this result is one of the objects of this invention.

In the manufacture of hollow bodies from veneer wound on a drum a band having a longitudinal grain is wound on the drum under high tension, the object of the said high tension being to produce the pressure necessary for pressing the layers of veneer on one another with a pressure sufficient to produce an intimate connection of the superposed layers of veneer by the glue applied thereto. In some cases layers of veneer have been wound on the drum in which the grain ran alternately in circumferential and axial direction, in which case the pressure was exerted by the veneer having the grain running circumferentially of the drum.

However, in practice a sufficient tension of the veneer cannot be applied because the grain does not run exactly in the longitudinal direction of the veneer, the said grain not being always parallel to and longitudinal of the band of veneer by reason of irregularities in the growth of the tree. Therefore the veneer is frequently torn by high tension angularly of its length. By placing the tool for applying the tension as closely as possible to the drum the danger of breakage may be reduced, but is cannot be entirely avoided.

The object of the present improvements is to provide an apparatus in which the pressure necessary for uniting the superposed veneers is produced in a similar way as in the method of uniting superposed plane plates of veneer by means of hydraulic presses, the said pressure being exerted on the layers of veneer transversely of the surface thereof. In my improved apparatus such transverse pressure is exerted by means of a steel band wound around the veneer with high tension, the leading end of the veneer being secured to the drum, and the drum having the veneer fixed thereto and wound on its surface by being rotated relatively to the steel band.

My improved machine may be used for manufacturing cylindrical hollow bodies. But it may also be used for manufacturing hollow bodies of polygonal cross-section.

My improved process is particularly suitable for manufacturing hollow bodies which are conical in shape, and which are wound from segmental blanks of veneer in which the grain runs in part more or less transversely of the blank. By exerting the transverse pressure on the veneer by means of the steel band the longitudinal tension exerted on the blanks of veneer is reduced to a minimum, so that blanks in which the grain runs more or less in transverse direction are not torn when being wound on the drum.

My invention also relates to means for applying heat to the blank after winding the same on the drum for causing the glue to set, the heat being applied both from the inside and outside of the hollow body of the veneer.

For the purpose of explaining the invention an example embodying the same has been shown in the accompanying drawings, in which the same letters of reference have been used in all the views to indicate corresponding parts. In said drawings, Fig. 1 is a diagrammatical elevation showing the apparatus, Fig. 1a is a top plan thereof.

Fig. 2 is a sectional elevation taken on the line 2—2 of Fig. 3 and showing the drum on which the veneer is wound, Fig. 3 is a sectional elevation taken on the line 3—3 of Fig. 2, Fig. 4 is an elevation showing a piece of veneer having blanks marked thereon, Fig. 5 is a similar elevation showing differently arranged blanks, Fig. 6 is a perspective view showing a coil of veneer, Figs. 7 and 8 are perspective views showing methods of peeling the veneer from blocks, Fig. 9 is a diagrammatical sectional elevation showing the apparatus and heating means associated therewith, and Fig. 10 is a perspective view of a piece of conically wound ply-wood for a barrel.

In the example shown in Fig. 1 the machine is constructed for manufacturing hollow bodies from two blanks of veneer having longitudinal grain and a blank of veneer having transverse grain and placed between the first-named blanks having longitudinal grain. The blanks are taken from comparatively long bands of veneer, and the band 1 having longitudinal grain is taken from a drum 2 having the band 1 wound thereon, and the band 3 having transverse grain is taken from a similar drum 4. See Fig. 1. The band 1 is guided by means of a table 5 and supplied to a winding drum 6, a pair of hand-operated feed rollers 7 being provided for feeding the blank to the drum. Further, a blade 8 is provided for cutting the desired lengths from the band.

The band 3 having transverse grain is fed from the drum 4 by means of a pair of feed rollers 10 and passed through a cutting mechanism comprising a blade 11, the mechanisms being arranged so that the blank 3' cut from the band 3 is placed on the band 1 and fed by the rollers 7 to the winding drum.

Glue is applied to the band 3. In Fig. 1 the glue is taken in the form of films 14 from rollers 13 located respectively above and below the band 3, the said films being pressed on the band by means of the feed rollers 10.

For exerting pressure on the veneer wound on the drum 6 a strong band 17 of steel is partly wound around said drum, the leading end of the said band being secured by means of a link 18 to the table 5, and the tail end being attached by means of a pair of links 19 to a lever 20 rockingly mounted at 21 and carrying a shiftable weighted body 22. The links 19 engage the lever 20 near the fulcrum thereof, so that high tension is exerted by means of the weighted body 22, and the said tension may be adjusted by shifting the weighted body on the lever 20. The links 19 engage the band 17 at opposite sides so that the blanks of veneer may pass between the same.

The winding drum 6 is composed of four segments 25a, 25b, 25c, 25d and four bars 26a, 26b, 26c, 26d of T-shaped cross-section, the said bars filling the spaces between the segments, so that a drum of continuous surface is produced by the segments and the bars. Only between one of the flanges designated by the numeral 27 of the bar 26a and the adjacent edge 28 of the segment 25a there is a slight gap, the said flange being enlarged as compared to the other flange of the bar, and the said flange and the edge 28 of the segment 25a being shaped so that the leading end of the band 1 may be clamped between the same before starting the winding thereof.

The segments and bars are connected with setting mechanism to be described hereinafter and adapted to be operated by means of a hand wheel 30 for moving the said parts radially inwardly or outwardly, the radial movement of the segments being larger than that of the bars. After winding the blanks of veneer on the drum and allowing the glue to set, the segments and bars are moved inwardly for releasing the jacket of veneer, the band 17 being first relieved from tension by lifting the weighted body 22 and supporting the same in elevated position. Preferably one of the bars 26a is mounted so as to remain in position when shifting the other bars in radial direction. Thereby at the beginning of the work and when the said bar 26a is at the bottom side of the drum and in the position which in Fig. 1 is occupied by the bar 26b the band 1 may be readily passed between the clamping members 27 and 28. When moving the band 1 to the right by means of the feed rollers 7 its end slides under the flange 27 of the bar 26a, and when afterwards the operator moves the other members or segments of the drum 6 outwardly the end of the band is clamped between the flange 27 and the edge 28 of the segment 25a.

In the construction of the apparatus shown in Fig. 1 the steel band 17 embraces about three quarters of the circumference of the drum 6, which has been found to be sufficient for practical purposes. The extent to which the steel band 17 encircles the drum may of course be varied and so may the shape of the lever 20, but the shape and mode of mounting of this lever must of course always be such that it exerts tension in the right manner on the band 17.

The apparatus shown in Fig. 1 is operated as follows:

The band 17 is loose, and the segments of the drum 6 have been retracted inwardly. The drum 6 is positioned so that the bar 26a is at its bottom side. Now the leading end of the band 1 is passed under the flange 27 and into position for clamping engagement with the said flange and the edge 28, and the parts of the drum are forced outwardly into the position shown in Fig. 1, and the lever 20 is released so that the band 17 is pressed on the drum. Now the drum is rotated by suitable driving mechanism, and the feed rollers 10 for the band 3 are operated so that the said band 3 is advanced, a suitable length 3' and cut by means of a knife 11, and the blank thus cut from the band is wound on the drum only after one turn of the band 1 has been wound on the drum 6. Thus the blank 3' is wound on the drum together with the second layer of the blank 1, so that after being wound on the drum it is located between two turns of the blank 1. The blade 8 cuts the desired length of veneer from the band 1 immediately behind the tail end of the blank 3' or a suitable length behind the same for permitting the same to overlap the blank 3'. If it is desired to manufacture a cylinder having more than three layers of veneer, for example five, seven or more layers, the operation of the blades 8 and 11 is controlled so that the blade 8 cuts a length from the band corresponding to the desired number of layers, while the blade 11 cuts a blank from the band 3 the length of which is shorter than the blank cut from the band 1 by the circumference of the drum.

In the operation of the apparatus the wood veneer is subject to a certain longitudinal tension. However, the said tension is so small that the veneer does not break. After the wood veneer has once been passed between the drum and the steel band the friction between the drum and the veneer is such that the veneer is carried along without subjecting the leading parts of the veneer secured to the drum to undue strain. When winding the first layer of veneer on the drum it is only necessary to place the same loosely around the drum, and the highest pressure is necessary only when placing the second layer on the first one for gluing the same together. Therefore the tension of the steel band may be regulated so that it acts with comparatively low pressure on the first layer of veneer, whereby the strain of the leading end of the veneer secured to the drum is reduced. When the second layer of veneer is wound on the first one for being glued thereto the band is already in frictional engagement with the drum so that when applying the highest pressure by means of the steel band the joint between the leading end of the veneer and the drum and therefore the position of the band on the drum is not endangered.

In the manufacture of plane plates of veneer in the press the layers of veneer are at rest. In my improved apparatus the wood veneer is subject to uniform pressure though the layers of veneer have a certain displacement beneath the steel band and are combined with each other by pressure. The radial pressure exerted by the steel band causes tangential friction on the hollow body being formed, and therefore from the beginning of the operation the surfaces of the veneer are rubbed relatively to each other so that the glue is rubbed into the pores of the veneer. The pressure exerted by the steel band on the veneer can be so high that the layers of wood are compressed and reduced in thickness, the said reduction of thickness being caused by the drying of the body subject to pressure. By thus rubbing the glue the setting thereof is assisted, and the glue is forced into the pores of the veneer.

The surface pressure of the steel band may be different according to the character, the thickness and other conditions of the veneer, the character of the glue and the desired strength of the connection of the layers of veneer. In practice it varies from 3 to 20 kilogrammes per square centimeter.

When winding the veneer on the drum the wood is not only compressed, but it is also made to shrink by the heat applied thereto for causing the glue to set, the said wood always having a certain humidity even if it has been dried in the air. The shrinking varies according to the humidity of the wood from 5 to 50%. The steel band laid around the drum is put under tension by elastic mechanical means, and in lieu thereof I may provide hydraulic or air pressure, as will be described hereinafter, so that the pressure remains constant, even if the hollow body is reduced in diameter by several millimeters. By the shrinking of the wood a high internal tension is produced by means of which the body of wood is forced under high pressure on the drum. Thereby the joint between the layers of veneer is further improved.

The apparatus may be made more simple in construction, particularly if only one intermediate blank 3' having transverse grain is needed, by supplying blanks 3' which have before been cut from the endless band to the desired length, and placing the same by hand between the rollers 7 or on a blank having longitudinal grain and cut to the desired length from the band 1. Further, it is not necessary to provide a drum 2 having the band 1 wound thereon, and the blanks having longitudinal grain may be prepared beforehand and supplied to the machine by hand. Also when thus preparing and supplying the blanks the main advantage of my improved machine is obtained, viz. the manufacture of the blank by surface pressure and heat. The apparatus may also be used for manufacturing hollow bodies from several layers of a peeled band having the grain running longitudinally thereof. Even such hollow bodies may be manufactured on the apparatus which consist of a single band having transverse grain.

The drum 6 is secured to a shaft 101 which is mounted with its portion 102 in a bearing 103 of any known or preferred construction. The opposite end of the shaft is not mounted in a bearing. Thus, the hollow body may be readily removed from the drum at the free end thereof. Other methods of mounting the shaft than by means of the single bearing 103 may also be employed. Adjacent to the bearing 103 a gear wheel 104 is mounted on the shaft and the said gear wheel is in driving engagement with a suitable driving apparatus such as an electro-motor. The segments of the drum are mounted on end disks 105 and 108 formed with hubs 106 and 109, and the hub 106 is fixed to the shaft by means of a key 107. In the construction shown in Fig. 2 the gear wheel 104 is not directly secured to the shaft 101, but to the hub 106. The hub 109 of the disk 108 is mounted on the outer end of the shaft 101 and it is fixed in position by means of screws 111. At its left hand end the shaft 101 is provided with an axial bore 112 having a cylindrical nut 113 slidably mounted therein, the said nut being engaged by a screw-threaded spindle 114 formed with a collar 115 disposed in an annular recess of the hub and between the same and the end face of the shaft 101. The hub 109 is formed with an axial bore through which the spindle 114 is passed, and the said spindle carries the hand wheel 30.

To prevent injury to the hollow body made on the drum the said drum is constructed for being expanded and contracted in diameter. In the example shown in the figures the drum is constructed as follows:

On the shaft 101 a conical hollow block 117 is axially shiftable, and the said block is connected by one or more screws 118 with the nut 113 which for this purpose is provided with radial bores one for each of the inner ends of the screws 118. Thus the conical block 117 is coupled with the nut 113, and it prevents rotation of the said nut when operating the spindle 114. The screw or screws 118 are passed through longitudinal slots 119 of the shaft 101 and they provide a guide for the block 117 preventing the same from rotating on the shaft 101.

The segments forming the drum 6 are segments of steel secured to segmental blocks or jackets 125, the said parts being spaced from each other to provide annular chambers 225, and the said chambers are used for internally heating the drum. For example they have electrical heating coils embedded therein, or they are connected with pipes for circulating a heating medium such as gas or steam therethrough. If desired heating coils are also applied to the bars if the heating effect from the segments is not sufficient. The supporting blocks 125 are arranged in the manner of the jaws of a chuck, and in the construction shown in Fig. 3 they are T-shaped in cross-section, their web portions 127 bearing on the conical block 117.

The web portions 127 are formed with longitudinal grooves 127' which are undercut at their inner ends to provide shoulders on which the heads of bolts 128 are mounted, which bolts are screwed into bores of the conical block 117 thus providing guides for the members 125, 127 on the conical block 117.

At their outer ends the blocks 125, 127 are formed with inwardly directed flanges 126 engaging in radial grooves 130 of the disk 108, and in a similar way the inner ends of the segments engage in radial grooves 130' of the disk 105, the outward movement of the blocks 125 being limited by blocks 132 fitted in the outer ends of the grooves 130, 130' and fixed in position by means of screws and setting pins 131.

As appears from the bottom part of Fig. 2 the T-shaped bars located between adjacent segments are guided with their ends in radial grooves 135 of the members or disks 105 and 108, and they are held in position by means of coiled springs 136 tending to retract the same inwardly. The said coiled springs are fixed at their inner ends to bars 137 engaging, with their right hand ends, in bores 138 of the disk 105 and with their left hand ends in bores of a member 139 secured to the shaft 101. Thus the bars bear with the bevelled ends of their flanges on the bevelled edges of the segments and they follow the inward and outward movements thereof.

The grooves 135 in which the bars are guided are shorter than the radial displacement of the segments inwardly, so that the bars project beyond the circumference of the segments which have been retracted inwardly.

One of the bars, viz. the bar 26a, is mounted differently from what has been described above, the said bar being used for clamping the leading end of the blank of veneer between the same and the drum. As appears from the right hand bottom part of Fig. 3 the web of the said bar 26a is formed at its ends with two trunnions 140 by means of which it is rockingly mounted in bores of the disks 105 and 108. For rocking the bar 26a about the said trunnions 140 screws 141 formed with conical points are provided which screw in bores of the disks 105 and 108, the conical ends of the said screws engaging an inner flange 26a of the bar. By means of the said screws the bar 26a can be set into position for clamping the leading end of the blank between the flange 27 and the end face 28.

The parts are to be set while the shaft 101 is at rest, and for expanding and contracting the drum the hand wheel 30 is used by means of which the nut 113 disposed in the bore 112 of the shaft 101 is shifted in axial direction, the conical body 117 taking part in such axial movement. Thereby the members 125 and 126 which are movable in radial direction only are shifted inwardly or outwardly according to the direction of the rotation of the wheel 30.

By means of the apparatus hollow bodies may be manufactured which are not circular in cross-section. The bodies may be made of polygonal cross-section, provided the steel band placed around the drum is sufficiently elastic to exert high pressure on the plane surfaces of the veneer.

The veneer having the grain running in longitudinal direction is put under tension only after it has been applied to the drum, and simultaneously it is pressed on the drum in radial direction and inwardly. Thus all the fibres of the wood are immediately subjected to pressure. From this results the possibility of manufacturing conical bodies by winding.

When winding conical hollow bodies such veneer blanks as have a rectilinear longitudinal grain are applied on the drum from the side thereof and obliquely, and the blank is applied to the conical drum in rectilinear direction only in exceptional cases. The danger resulting from this fact is entirely obviated in my improved apparatus in which after clamping a segmental blank of veneer having the grain running substantially in longitudinal direction the tension is produced only on the drum itself, because by the steel band pressure is exerted on the wood preventing tearing of the veneer. Therefore also conically peeled veneer bands may be used which are more readily torn than bands having the grain running in longitudinal direction.

For manufacturing conical or pyramidal hollow bodies a tapering drum is used which has a circular or polygonal cross-section, and the steel band 17 has a shape corresponding to the tapering shape of the drum. Conical hollow bodies are manufactured in a similar way as has been described with reference to the manufacture of cylindrical bodies, the said conical bodies being manufactured from endless bands having the grain running substantially in longitudinal direction, and I may place, between successive layers, blanks having a transverse grain. Further, I may use sectional blanks of the desired length.

If however, an annular blank needed for forming a conical body is cut as a whole from a plate of veneer which has been made either by peeling or by cutting the same from a board, the said annular blank has a grain which is directed relatively to the diameter alternately in longitudinal and in transverse direction. If now a portion of the blank in which the grain runs in a longitudinal direction is clamped on the drum at the beginning of the work high tension may be applied to the blank without tearing the same. When further winding the blank on the drum the danger of tearing the blank is obviated, because the blank is smoothly placed on the surface of the drum. When the operator winds the annular blank on the drum the grain is placed transversely in successive sections and at an angle of 90°, so that a hollow body of veneer in the form of a cone is produced, and it is not necessary to insert a blank of veneer having a transverse grain. For producing a reliable veneer it is not necessary that the grain of the superposed sections be disposed crosswise exactly at an angle of 90°, a satisfactory action being obtained also when the grain is disposed at other angles, say 60°. In the construction of the winding apparatus this fact should be borne in mind.

In Figs. 4 to 8 I have illustrated the method of manufacturing conical hollow bodies. Fig. 4 shows a band 151 of wood veneer on which blanks 152 having longitudinal grain and blanks 153 having transverse grain have been drawn, the said blanks being cut from the plate by punching and being afterwards combined on the drum by means of the steel band 17. In Fig. 5 I have shown a modification in which from a band 151 of wood veneer obtained by peeling or by means of a knife rings 154 or sections thereof are punched. In Fig. 5 I have shown a blank in the form of a segment covering three quarters of a circle. If in such a blank one third provides one layer for the drum, as has been indicated in dotted lines, a hollow conical body is obtained which comprises three layers, the imaginary apex of the cone coinciding with the centre of the segment 154. Further, from a single blank a reliable joint for the veneer is obtained, because after winding, the portions indicated by the dotted lines are superposed. At the line 154a the grain runs longitudinally of the blank, and at the line 154b the grain runs transversely of the blank, so that after winding the grain of the superposed layers is disposed at right angles. The same applies also to the portions adjacent to the other dotted lines shown in Fig. 5.

A conical hollow body may also be manufactured from a band having the grain running in transverse direction, as is shown in Fig. 6. If desired a band having longitudinal grain may be wound on the drum together with the band shown in Fig. 6.

In Fig. 7 I have shown simple means for peeling a band of the form shown in Fig. 6, the said band being cut from a conical block of wood 156 by means of a peeling blade 157 located relatively to the block so that its edge passes through the apex of the cone, or nearly so.

In the modification shown in Fig. 8 a block 156 of wood is held between two bearings 158 and 159 which are out of alignment, so that an endless conical band is peeled from the block.

In Fig. 9 I have shown a modification of the means for regulating the tension of the steel band 17, the said means comprising a hydraulic or compressed air press. The said press comprises two cylinders 160 and 161 and their pistons 162 and 163 disposed in axial alignment, the said pistons being secured to a piston rod 164 connected to the lever 20. To the cylinder 161 pressure fluid of variable pressure is supplied through an intake port 165, and to the cylinder 160 pressure fluid is supplied through an intake port 166, the pressure of the fluid supplied through the port 166 having a higher pressure than the fluid supplied through the port 165. The pressure of the fluid may be regulated by automatic valves. Thereby the tension of the band 17 may be regulated for example intermittently, so that when first applying the wood veneer having the grain running in longitudinal direction to the drum, the tension of the band 17 is at the beginning comparatively small, and it is intermittently increased when a blank is supplied in which the grain runs in transverse direction.

By providing a steel band 17 which does not take part in the rotation of the winding drum external heating means may be readily provided. On the steel band, which may be polished at its inner side, heating elements of any type may be mounted, which heating elements may be operated electrically, by steam, or by gas, and which heat the steel band to the desired temperature. According to the character of the glue and the wood the temperature will be from 80 to 200° C. By simultaneously providing internal heating means for heating the drum to the same temperature as the steel band, heat is applied to the wood from both sides, so that the winding of the veneer and the setting of the glue are completed within a minimum of time. Cylinder bodies having three layers of normal thickness are completed within the time or from 1½ to 3 minutes.

In the example shown in Fig. 9 the external heating means are in the form of an annular heating pad 167 laid around the steel band 17, the electrical resistances of the pad being connected through an adjustable resistance 168 to a line 169.

I claim:

1. An apparatus for manufacturing hollow bodies from wood, comprising a rotary drum, an anchored band laid around said drum, means for putting said band under tension, means for supplying wood veneer to said drum between the same and the band, and heating means comprising a pad containing heating elements extending over the surface of said band.

2. An apparatus for manufacturing hollow bodies from wood, comprising a rotary drum composed of radially movable segments and an axially shiftable cone for radially moving said segments, means movable with said segments for filling the longitudinal spaces between the segments, a band laid around said drum, means for putting said band under tension, and means for supplying wood veneer to said drum between the same and the band.

3. An apparatus for manufacturing hollow bodies from flexible strips of wood, comprising a rotary winding drum composed of radially movable spaced segments, spring-pressed bars between said segments adapted to fill the spaces between the segments and overlap the longitudinal edges thereof on the outside of the drum, and an axially shiftable cone for radially moving said segments and said bars, a stationary band laid around said drum, means for putting said band under tension, and means for supplying wood veneer to said drum between the same and the band.

4. An apparatus for manufacturing hollow bodies from wood, comprising a rotary drum composed of a pair of end disks, radially movable bars between said disks, radially movable segments between said disks and overlapped externally along their longitudinal edges by said bars, and an axially shiftable cone for radially moving said segments and bars, said segments and bars being guided in radial grooves made in said disks, and the radial grooves for said bars being shorter than the radial path of said segments, a band laid around said drum, means for putting said band under tension, and means for supplying wood veneer to said drum between the same and the band.

5. An apparatus for manufacturing hollow bodies from wood, comprising a rotary drum composed of radially movable segments each consisting of a segmental carrier and an outer jacket spaced therefrom forming a heating space, a band laid around said drum, means for putting said band under tension, and means for supplying wood veneer to said drum between the same and the band.

6. An apparatus for manufacturing hollow bodies from glued ply-wood layers, comprising a rotary drum, an anchored band laid around said drum, heating means comprising a pad containing heating elements in contact with said band and extending over the surface thereof, a fluid operated multi-stage press for putting said band under tension, means for regulating the pressure of the fluid supplied to said press, and means for supplying wood veneer in layers with the grain crossed to said drum between the same and the band.

7. Apparatus for manufacturing hollow bodies from wood, comprising a rotary drum having end disks, radially movable segments extending between said disks, radially movable bars extending between said disks and lying between the segments and externally overlapping the latter, fixed bars in the drum to which the movable bars are yieldably connected, the disks having radial guide grooves receiving the ends of said segments and movable bars, an axially shiftable cone in said drum for axially shifting said segments and said movable bars, a pressure band around the drum, and means for feeding wood veneer in strip form between the band and the drum.

8. Apparatus for producing hollow vessels of ply-wood comprising a rotary winding drum which is made up of axially extending segments, bars between and overlapping the latter, means in the drum whereby the segments and bars are radially adjustable and spring pressure means tending to retract the bars.

9. Apparatus for producing hollow ply-wood vessels comprising a rotary winding drum made up of segments, bars between and overlapping the segments, disks at the ends of the drum, with grooves engaged by the bars and segments, the grooves for the bars being shorter than the grooves for the segments, so that the bars in the innermost position of the segments protrude between the latter, to facilitate withdrawing the finished hollow body.

10. Apparatus for producing hollow vessels comprising a rotary winding drum having segments with bars that are bodily movable radially of the drum between and overlapping the segments, one of the bars having a projection to engage and clamp the edge of a band to be wound on the drum.

11. A process for producing hollow bodies of ply-wood which consists in winding about a rotary drum a length of longitudinally grained veneer corresponding approximately to the length of the inner circumference of the body to be produced, covering both sides of a transversely grained band of veneer with adhesive, winding said band about said first band and continuing the winding of an additional length of the first band about the second and subjecting said bands to pressure and heat in the course of said winding to cause them to become secured together.

12. A process for producing hollow bodies of ply-wood consisting in winding about a rotary drum a length of longitudinally grained veneer corresponding approximately to the length of the inner circumference of the body to be produced, covering both sides of a transversely grained band of veneer with adhesive, winding said band about said first band and continuing the winding of an additional length of the first band about the second and subjecting said bands to the action of a member encircling said drum and imparting friction upon said bands with sufficient pressure to cause them to be permanently united to said adhesive.

GEORG SCHLESINGER.